(12) United States Patent
Drew et al.

(10) Patent No.: US 7,818,587 B2
(45) Date of Patent: Oct. 19, 2010

(54) DATA TRANSFER SYSTEM ENCRYPTING DATA WITH INFORMATION UNIQUE TO A REMOVABLE DATA STORAGE ITEM

(75) Inventors: John William Drew, Stoke Gifford (GB); Liqun Chen, Stoke Gifford (GB); Jonathan Peter Buckingham, Stoke Gifford (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1120 days.

(21) Appl. No.: 11/493,910

(22) Filed: Jul. 25, 2006

(65) Prior Publication Data

US 2007/0083759 A1    Apr. 12, 2007

(30) Foreign Application Priority Data

Oct. 11, 2005    (GB) ................................. 0520606.5

(51) Int. Cl.
*G06F 12/14* (2006.01)
*G06F 13/00* (2006.01)

(52) U.S. Cl. ...................... 713/193; 380/44; 711/100
(58) Field of Classification Search .................... 380/44
See application file for complete search history.

(56) References Cited

U.S. PATENT DOCUMENTS

| | | | |
|---|---|---|---|
| 5,235,641 A | 8/1993 | Nozawa et al. | |
| 5,535,279 A | 7/1996 | Seestrom | |
| 5,651,064 A | 7/1997 | Newell | |
| 5,757,908 A | 5/1998 | Cooper et al. | |
| 5,905,798 A | 5/1999 | Nerlikar et al. | |
| 5,970,147 A | 10/1999 | Davis | |
| 6,134,660 A | 10/2000 | Boneh et al. | |
| 6,343,282 B1 | 1/2002 | Oshima et al. | |
| 6,357,005 B1 | 3/2002 | Devaux et al. | |
| 6,378,007 B1 | 4/2002 | Southwell | |
| 6,381,662 B1 | 4/2002 | Harari et al. | |
| 6,473,861 B1 | 10/2002 | Stokes | |
| 6,691,226 B1 | 2/2004 | Frank et al. | |
| 7,031,470 B1 | 4/2006 | Bar-On | |
| 7,181,624 B2 | 2/2007 | Asano et al. | |
| 7,200,546 B1 | 4/2007 | Nourmohamadian et al. | |
| 7,278,016 B1 | 10/2007 | Detrick et al. | |
| 2003/0074319 A1* | 4/2003 | Jaquette ....................... 705/51 | |
| 2003/0204717 A1 | 10/2003 | Kuehnel | |

(Continued)

FOREIGN PATENT DOCUMENTS

EP    0913823 A2    5/1999

(Continued)

OTHER PUBLICATIONS

"Cryptostore Tape 700 Family—Enterprise Class Tape Appliances," Neoscale Systems, 2002.

(Continued)

*Primary Examiner*—Christian LaForgia

(57) ABSTRACT

A data transfer system comprising a host device and a data transfer device. The host device generates an encryption key based upon information unique to a removable data storage item onto which data are to be stored. The encryption key is then delivered by the host device to the data transfer device. Data to be stored are encrypted by the data transfer device using the encryption key.

13 Claims, 3 Drawing Sheets

U.S. PATENT DOCUMENTS

| | | |
|---|---|---|
| 2004/0101140 A1 | 5/2004 | Abe |
| 2004/0107340 A1 | 6/2004 | Wann et al. |
| 2004/0190860 A1 | 9/2004 | Ishiguchi |
| 2004/0215955 A1 | 10/2004 | Tamai et al. |
| 2005/0071591 A1 | 3/2005 | Goodman et al. |
| 2005/0198529 A1* | 9/2005 | Kitani ............ 713/200 |
| 2005/0244001 A1 | 11/2005 | Kitani et al. |
| 2005/0278257 A1 | 12/2005 | Barr et al. |
| 2006/0015946 A1 | 1/2006 | Yagawa |
| 2006/0048039 A1* | 3/2006 | Barrett et al. ............ 714/799 |
| 2007/0005974 A1* | 1/2007 | Kudou ............ 713/171 |
| 2007/0081670 A1* | 4/2007 | Topham et al. ............ 380/239 |
| 2007/0083758 A1* | 4/2007 | Topham et al. ............ 713/168 |
| 2007/0094309 A1* | 4/2007 | Buckingham et al. ....... 707/202 |
| 2007/0180272 A1* | 8/2007 | Trezise et al. ............ 713/193 |
| 2008/0010396 A1* | 1/2008 | Itou et al. ............ 711/100 |

FOREIGN PATENT DOCUMENTS

| | | |
|---|---|---|
| EP | 1020856 A2 | 7/2000 |
| EP | 1267245 A2 | 12/2002 |
| EP | 1 333 353 A2 | 8/2003 |
| EP | 1367764 A2 | 12/2003 |
| EP | 1 585 006 A2 | 10/2005 |
| GB | 2 264 373 A | 8/1993 |
| GB | 2 315 575 A | 2/1998 |
| GB | 2330682 A | 4/1999 |
| WO | 02/05482 | 1/2002 |
| WO | 03/034425 A1 | 4/2003 |
| WO | WO 2006/098009 A1 * | 9/2006 |

OTHER PUBLICATIONS

Marisa, M., Tape Inscription Devices: Host/based vs. Appliance New Tape Measure, Storage and Server Technology, Retrieved Nov. 28, 2005 <http://www.networkcomputing.com/shared/artic/printFullArticleSrc.jhtml?articleID=173602939>.

"Cryptostore for Tape-Storage Security Appliance for Backup," Neoscale Systems, 2002.

* cited by examiner

DATA TRANSFER SYSTEM ENCRYPTING DATA WITH INFORMATION UNIQUE TO A REMOVABLE DATA STORAGE ITEM

FIELD OF THE INVENTION

The present invention relates to a data transfer system for transferring data to and from a removable data storage item, wherein the data are encrypted and decrypted during data transfer using identity-based encryption.

BACKGROUND OF THE INVENTION

Data backup is a valuable tool in safeguarding important data. Data are generally backed-up onto removable data storage items, such as tape cartridges or optical discs, such that the backup data may be stored at a different geographical location to the primary data.

By storing important data onto removable data storage items, security issues become a consideration. For example, a visitor to a site might easily pocket a tape cartridge storing large amounts of commercially sensitive data.

Many backup software packages provide the option of encrypting data prior to backup. A drawback with this approach, however, is that data stored on a particular removable data storage item may be encrypted using various different encryption keys. It is therefore necessary to maintain a database of encryption keys and data pointers for each and every removable data storage item. Maintaining such a database naturally attracts management overheads. Additionally, the database may grow to a significant size, must always be available for access and is itself a potential security risk.

SUMMARY OF THE INVENTION

The present invention provides a data transfer system comprising a host device and a data transfer device, wherein the host device is operable to: generate an encryption key based upon information unique to a removable data storage item onto which data are to be stored; and deliver the encryption key to the data transfer device; and wherein the data transfer device is operable to: receive the encryption key from the host device; receive data to be stored; and encrypt the data using the encryption key.

Preferably, the data transfer device is operable to deliver the information to the host device.

Advantageously, the data transfer device is operable to obtain the information from the removable data storage item.

Conveniently, the data transfer system comprises a plurality of removable data storage items, and the data transfer device stores a database of information unique to each of the plurality of data storage items.

Preferably, the information comprises a serial number.

Advantageously, the host device stores a master key and the host device is operable to generate the encryption key using an identity-based key generation algorithm using the master key and the information unique to the removable data storage item.

Conveniently, the host device is operable to deliver the data to be stored to the data transfer device.

Preferably, the data transfer device is operable to store the encrypted data to the removable data storage item.

Advantageously, the data transfer device is a tape drive and the removable data storage item is a tape cartridge.

Conveniently, the data transfer device is operable to output the encrypted data to a further data transfer device, the further data transfer device being operable to receive the encrypted data and store the encrypted data to the removable data storage item.

Another aspect of the invention provides a data transfer system comprising a host device and a data transfer device, wherein the host device is operable to: generate a decryption key based upon information unique to a removable data storage item from which data are to be retrieved; and deliver the decryption key to the data transfer device; and wherein the data transfer device is operable to: receive the decryption key from the host device; receive data to be retrieved; and decrypt the data using the decryption key.

Preferably, data transfer device is operable to deliver the information to the host device.

Advantageously, the host device stores a master key and the host device is operable to generate the decryption key using an identity-based key generation algorithm using the master key and the information unique to the removable data storage item.

Conveniently, the data transfer device is operable to retrieve the data from the removable data storage item.

Preferably, the data transfer device is a tape drive and the removable data storage item is a tape cartridge.

Advantageously, the data transfer device is operable to receive the data from a further data transfer device, the further data transfer device being operable to retrieve the data from the removable data storage item and output the data to the data transfer device.

A further aspect of the invention provides a data transfer system comprising a host device and a data transfer device, wherein the host device comprises: means for generating an encryption key based upon information unique to a removable data storage item onto which data are to be stored; and means for delivering the encryption key to the data transfer device; and the data transfer device comprises: means for receiving the encryption key from the host device; means for receiving data to be stored; and means for encrypting the data using the encryption key.

Preferably, the host device comprises: means for generating a decryption key based upon information unique to a removable data storage item from which data are to be retrieved; and means for delivering the decryption key to the data transfer device; and wherein the data transfer device comprises: means for receiving the decryption key from the host device; means for receiving data to be retrieved; and means for decrypting the data using the decryption key.

A still further aspect of the invention provides a data transfer device for storing data to a removable data storage item, the data transfer device being operable to: output information unique to the removable data storage item; receive an encryption key derived from the information output by the data transfer device; receive data to be stored; encrypt the data using the encryption key; and store the encrypted data to the removable data storage item.

Advantageously, the data transfer device is suitable for retrieving and outputting data from the removable data storage item, and the data transfer device is operable to: receive a decryption key unique to the removable data storage item; retrieve encrypted data from the removable data storage item; decrypt the encrypted data using the decryption key; and output the decrypted data.

Conveniently, the data transfer device is a tape drive and the removable data storage item is a tape cartridge.

In a still further aspect, the present invention provides a host device operable to: generate an encryption key based upon information unique to a removable data storage item; and output the encryption key for receipt by a data transfer device operable to encrypt data using the encryption key for transfer to the removable data storage item.

Preferably, the host device is operable to receive the information from the data transfer device.

In a further aspect, the present invention provides a computer program product storing computer program code executable by a host device, the computer program product when executed causing the host device to operate as described in the aforementioned aspects of the invention.

BRIEF DESCRIPTION OF THE DRAWINGS

In order that the present invention may be more readily understood, embodiments thereof will now be described, by way of example, with reference to the accompanying drawings, in which.

DETAILED DESCRIPTION

Figure 1:
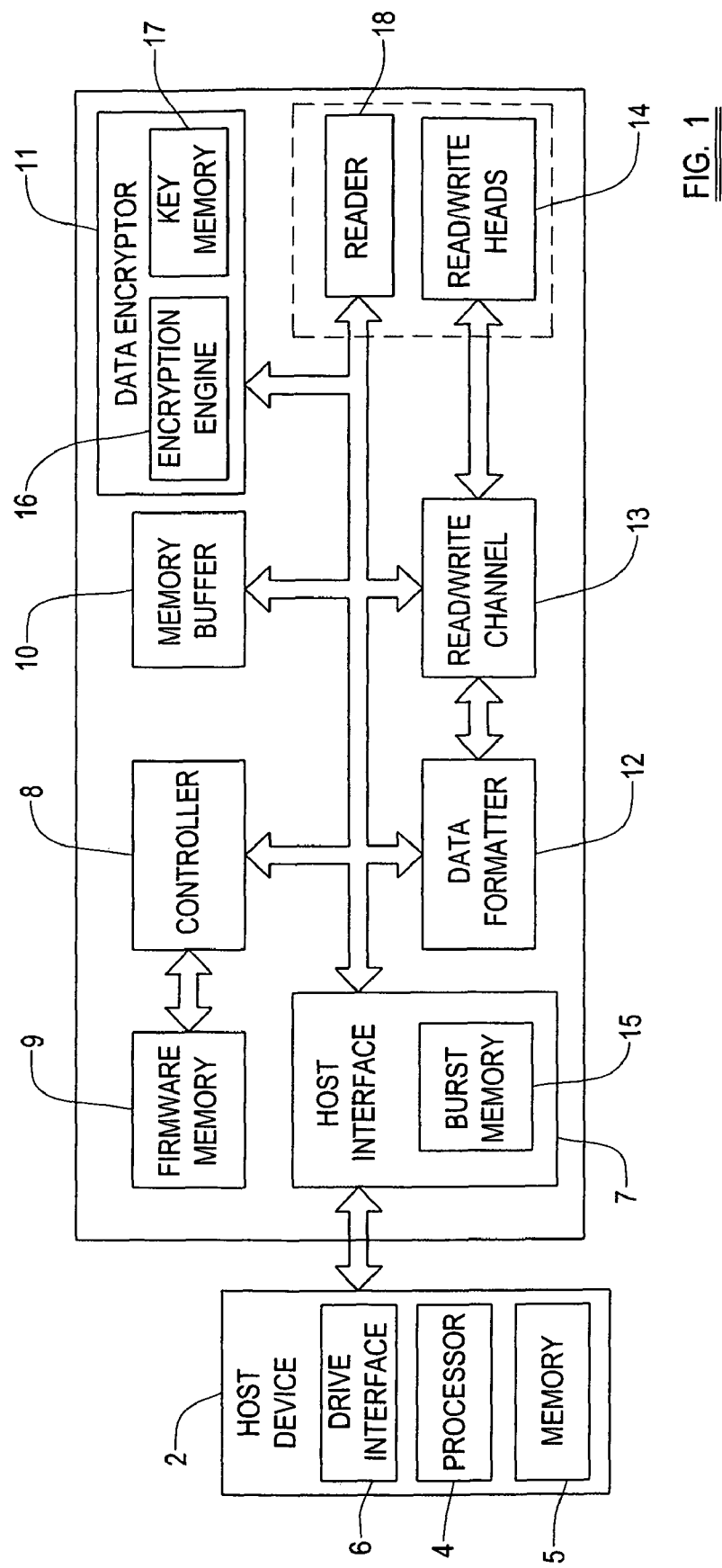
FIG. 1 is a schematic block diagram of a tape drive embodying the present invention.

The data transfer system 1 of FIG. 1 comprises a host device 2 coupled to a tape drive 3. The host device 2 includes a microprocessor 4, a memory 5 storing instructions executable by the microprocessor 4, and a drive interface 6. The tape drive 3 includes a host interface 7, a controller 8, firmware memory 9, a memory buffer 10, a data encryptor 11, a data formatter 12, a read/write channel 13, and magnetic read/write heads 14.

With the exception of the data encryptor 11 and the software stored in the firmware memory 9, the components of the tape drive 3 are identical to those employed in conventional tape drives.

The microprocessor 4 of the host device 2 executes instructions stored in the memory 5 to control the operation of the host device 2, as described below. Similarly, the controller 8 of the tape drive 3 comprises a microprocessor and executes instructions stored in the firmware memory 9 to control the operation of the tape drive 3. In particular, the controller 8 responds to control commands received from the host device 2 via the drive and host interfaces 6, 7.

Data to be stored are typically delivered by the host device 2 in high-speed bursts and the host interface 7 therefore includes a burst memory 15 to temporarily store the received data.

Figure 2:
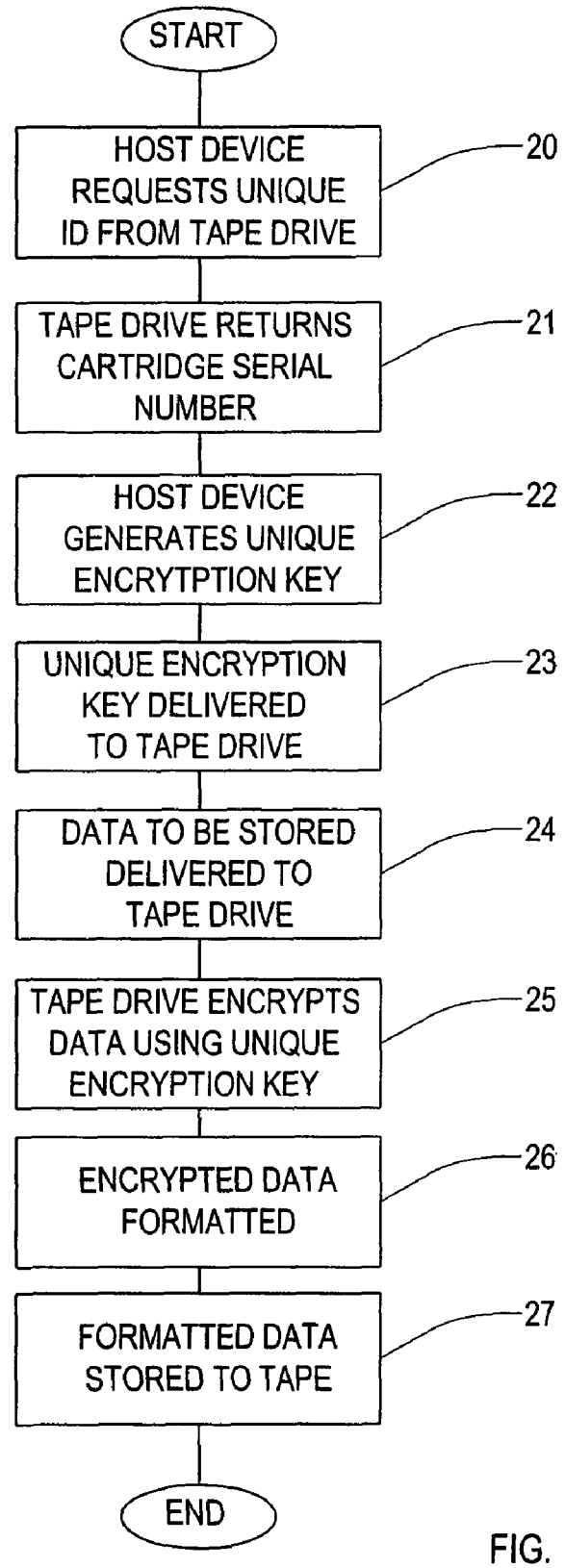
FIG. 2 is a flow diagram illustrating a method embodying the present invention.

Referring now to FIG. 2, when data are to be stored to a tape cartridge, the host device 2 issues 20 a command to the tape drive 3 requesting that a unique identifier be returned. In response, the controller 8 returns 21, via the host interface 7, the unique serial number of the tape cartridge onto which the data are to be stored.

The unique serial number may be written to the tape header of the tape cartridge, in which case the serial number is read in a conventional manner, i.e. by means of the magnetic read/write heads 14 and the read/write channel 13. Alternatively, or additionally, the unique serial number may be provided as machine-readable information (e.g. a barcode) provided on a surface of tape cartridge (e.g. as a label). In a further alternative, the tape cartridge may include a memory device that stores, among other things, a unique serial number. In these latter cases, the tape drive 3 may include a reader 18 (FIG. 1), such as an optical reader or transceiver, for reading the machine-readable information or the contents of the memory device, from which the controller 8 obtains the unique serial number.

In response to receiving the unique identifier, the host device 2 generates 22 a unique encryption key. The memory 5 of the host device 2 is non-volatile and stores a master key. The master key and the unique identifier are used by the host device 2 to generate the unique encryption key by means of a conventional identity-based key generation algorithm.

Two methods to create an encryption key based on the master key and the unique identifier are described:

In the first method, the master key is a symmetric secret key and a Message Authentication Code (MAC) algorithm can be used to compute function mapping strings of bits and a secret key to fixed-length strings of bits. The MAC algorithm satisfies the following two properties: (1) for any key and any input string the function can be computed efficiently; and (2) for any fixed key, and given no prior knowledge of the key, it is computationally infeasible to compute the function value on any new input string, even given knowledge of the set of input strings and corresponding function values, where the value of the ith input string may have been chosen after observing the value of the first i−1 function values.

If the MAC algorithm is denoted by MAC, the encryption key, k, can be computed as follows: k=MAC(MasKey, ID), where MasKey is the master secret key and ID is the unique identifier. Examples of MAC algorithms can be found in the following two documents which are incorporated herein by reference: (1) ISO/IEC 9797-1:1999. Information technology—Security techniques—Message Authentication Codes (MACs)—Part 1: Mechanisms using a block cipher; (2) ISO/IEC 9797-2:2002. Information technology—Security techniques—Message authentication codes (MACs)—Part 2: Mechanisms using a dedicated hash-function.

In the second method, the master key is an asymmetric key pair so an asymmetric identity-based key construction can be used in which: the encryption key is created by using the unique identifier and the master public key; and the decryption key is created by using the unique identifier and the master private key. For example:

Generating a Master Key Pair:
    create two large primes p and q with the sizes, $|p|\geq 1024$ bits and $|q|\geq 160$ bits respectively, satisfying q|p−1; one possible way to do so is
        choose a random prime q (|q|bits)
        choose a random integer c (|p|−|q|bits)
        compute p=cq+1, check if p is prime; if not, go back to the previous step and re-choose the value c
    choose an integer g at random such that $g^q=1$ mod p; one possible way to do so is
        choose a random integer d (|p|bits)
        compute $g=d^{(p-1)/q}$ mod p; if g=1, go back the previous step to re-choose the value d
    choose an integer x at random such that 1<x<q
    compute an integer $y=g^x$ mod p
    publish (g, p, q, y) as the master public key and keep x secret as the master private key.

Generating an Encryption Key and Encrypting a Data String:
    take a unique identifier string ID and a data string M as input
    choose an integer r at random such that 1<r<q
    compute an integer $z=g^r$ mod p
    compute the symmetric encryption key k=Hash($y^r$ mod p, ID)
    encrypt M under k to get the cipher text C=Enc(k, M)
    delete (k, M) and store (z, C, ID).

Where Hash is a one-way hash-function and Enc is a symmetric block cipher algorithm. The Hash algorithm can be found in the following publication which is incorporated herein by reference: ISO/IEC 10118-3:2004: Information technology—Security techniques—Hash-functions—Part 3: Dedicated hash-functions; and the Enc algorithm can be found in the following publication which is incorporated herein by reference: ISO/IEC 18033-3:2005: Information technology—Security techniques—Encryption algorithms—Part 3: Block ciphers.

Retrieving the Decryption Key and Decrypting the Cipher Text:
   take (z, C, ID) as input
   compute the decryption key k=Hash($z^x$ mod p, ID)
   decrypt C under k to get the data string M=Dec(k, C)
   delete (k, z, C) and store M.

Where Dec is a symmetric block decipher algorithm, which can be found in the following publication which is incorporated herein by reference: ISO/IEC 18033-3:2005: Information technology—Security techniques—Encryption algorithms—Part 3: Block ciphers.

Note that in the second method, generating k in the encryption process does not have to involve the owner of the master private key, so it can be done in the data encryptor 11 without communicating with the host device 2. Retrieving k in the decryption process must involve the owner of the master private key, so the communication with the host device 2 is required.

Having generated an encryption key based on the master key and the unique identifier by one of the above methods or other method, the unique encryption key is delivered 23 to the tape drive 3 by the host device 2 along with a 'store encryption key' command.

The data encryptor 11 of the tape drive 3 comprises an encryption engine 16 and a key memory 17. The tape drive 3, upon receiving the 'store encryption key' command and unique encryption key from the host device 2, stores the encryption key in the key memory 17.

Following delivery of the unique encryption key to the tape drive 3, the host device 2 delivers 24 a write data command to the tape drive 3, along with the data to be stored.

In response to the write command received form the host device 2, data stored in burst memory 15 are retrieved by the data encryptor 11. The data encryptor 11 then encrypts 25 the data by means of the encryption engine 16, which employs a symmetric encryption algorithm to encrypt the data using the encryption key stored in the key memory 17. The encrypted data are then stored by the data encryptor 11 to the memory buffer 5.

The controller 8 or data encryptor 11 may optionally embed or append error control coding or redundancy data to the data received from the host device 2 prior to encryption. For example, a CRC may be appended to the data prior to encryption. As detailed below, the inclusion of redundancy data enables the tape drive 3 to determine whether encrypted data later retrieved from the tape cartridge have been successfully decrypted.

The data formatter 12 formats 26 the encrypted data into a format suitable for writing to tape. Typically, the data formatter 12 ECC-encodes the encrypted data, randomises the ECC-encoded data to remove long sequences, and RLL encodes the randomised data. The formatted data are then processed by the read/write channel 13, which converts the formatted data into electrical signals for driving the magnetic read/write heads 14, thereby storing 27 the formatted data to tape.

After all data have been encrypted and stored to tape, the encryption key stored in the key memory 17 is optionally deleted such that no record of the encryption key is maintained. Alternatively, or indeed additionally, the contents of the key memory 17 may be inaccessible by the host device 2. In particular, whilst the contents of the key memory 17 may be overwritten by the controller 8 in response to a 'store encryption key' command issued by the host device 2, it is not possible for the contents of the key memory 17 to be read by the controller 8 or the host device 2. Instead, only the encryption engine 16 can read the contents of the key memory 17. Consequently, it is not possible for a user to obtain a copy of the encryption key.

The read process is basically the reverse of the write process. When data are to be retrieved from a tape cartridge, the host device 2 issues a command to the tape drive 3 requesting that a unique identifier be returned. In response, the controller 8 returns, via the host interface 7, the unique serial number of the tape cartridge from which the data are to be retrieved.

In response to receiving the unique identifier, the host device 2 generates a unique encryption key using the master key stored in memory 5 and the unique identifier. Once generated, the unique encryption key is delivered to the tape drive 3 by the host device 2 along with a 'store encryption key' command.

The data encryptor 11 of the tape drive 3 comprises an encryption engine 16 and a key memory 17. The tape drive 3, upon receiving the 'store encryption key' command and unique encryption key from the host device 2, stores the encryption key in the key memory 17.

Following delivery of the unique encryption key to the tape drive 3, the host device 2 delivers a read data command to the tape drive 3.

In response to the read command received form the host device 2, the magnetic read/write heads 14 are caused to pass over the relevant portion of the tape of the tape cartridge on which the requested data are stored. The resulting analogue signal is delivered to the read/write channel 13, which converts the analogue signal into digital data, which are then unformatted (e.g. decoded) by the data formatter 12 and stored in the memory buffer 10. The data encryptor 11 then decrypts the data stored in the memory buffer using the encryption engine 16 and the encryption key stored in the key memory 17. The decrypted data are then delivered to the host device 2 via the host interface 7.

As noted above, the controller 8 or data encryptor 11 optionally embeds or appends redundancy data to the data to be stored prior to encryption. In this optional embodiment, the controller 8 or data encryptor 11 checks the redundancy data following data decryption to ascertain whether the decryption process was successful. If the redundancy data of the decrypted data do not correspond to that expected, the controller 8 delivers an error signal to the host device 2 via the host interface 7 to indicate that the requested data could not be successfully decrypted. Unsuccessful decryption may arise because the wrong decryption key was used to decrypt the data and/or the encrypted data read from tape were corrupt.

After the requested data have been retrieved from the tape cartridge, the encryption key is optionally erased from the key memory 17.

Rather than the host device 2 requesting a unique identifier from the tape drive 3 each time data are to be stored to or retrieved from a tape cartridge, the tape drive 3 may instead request an encryption key from the host device 2 each time a new tape cartridge is inserted into the drive 3. The request by the tape drive 3 would be accompanied by the unique identifier of the tape cartridge. The encryption key generated and returned by the host device 2 is then stored in key memory 17 until such time as the tape cartridge is removed from the tape drive 3 or until a new tape cartridge is inserted. This then obviates the need for the host device 2 to generate an encryption key each time data are to be stored to or retrieved from the tape cartridge.

In the embodiments described above, the encryption engine 16 can employ a symmetric encryption algorithm and the key memory 17 stores a single encryption key that is used for both encryption and decryption of data. Alternatively, however, the encryption engine 16 may employ an asymmetric encryption algorithm, with the key memory 17 storing an encryption key during data storage and a separate decryption key during data retrieval.

Although embodiments of the present invention have been described with reference to a tape drive 3, it will be appreciated that the present invention is equally applicable to other types of data transfer devices, such as optical drives, in which data are stored to removable data storage items (e.g. CDs, DVDs).

Although embodiments of the present invention describe the unique identifier as comprising the tape serial identifier, there are other mechanisms for providing an identifier unique to the cartridge. For example, other unique identifiers can be derived from the tape drive, a tape library or some other pool of devices any of which can return an identifier to generate the encryption key. It is important that the value of the identifier which is used or returned cannot be easily altered since it provides the basis on which the encryption key is generated for that cartridge.

Figure 3:
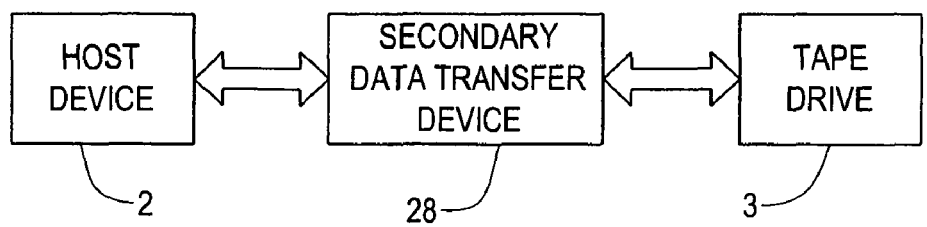
FIG. 3 is a schematic block diagram of another embodiment of the invention.

FIG. 3 illustrates another embodiment of the present invention in which the data transfer system 1 comprises a secondary data transfer device 28, which is responsible for encrypting and decrypting data on-the-wire. In this alternative embodiment, the secondary data transfer device 28, rather than the tape drive 3 or other primary data transfer device, comprises the encryption engine 16 and key memory 17. The secondary data transfer device 28 is located between the host device 2 and the tape drive 3, and fields commands received by the host device 2. When storing data to or retrieving data from a tape cartridge, the host device 2 requests the unique identifier from the tape drive 3 in the manner described above. The encryption key generated by the host device 2 is then delivered and stored to the key memory 17 of the secondary data transfer device rather than the tape drive 3. The data to be stored or retrieved are then encrypted or decrypted by the secondary data transfer device 28 on-the-wire between the host device 2 and the tape drive 3.

Figure 4:
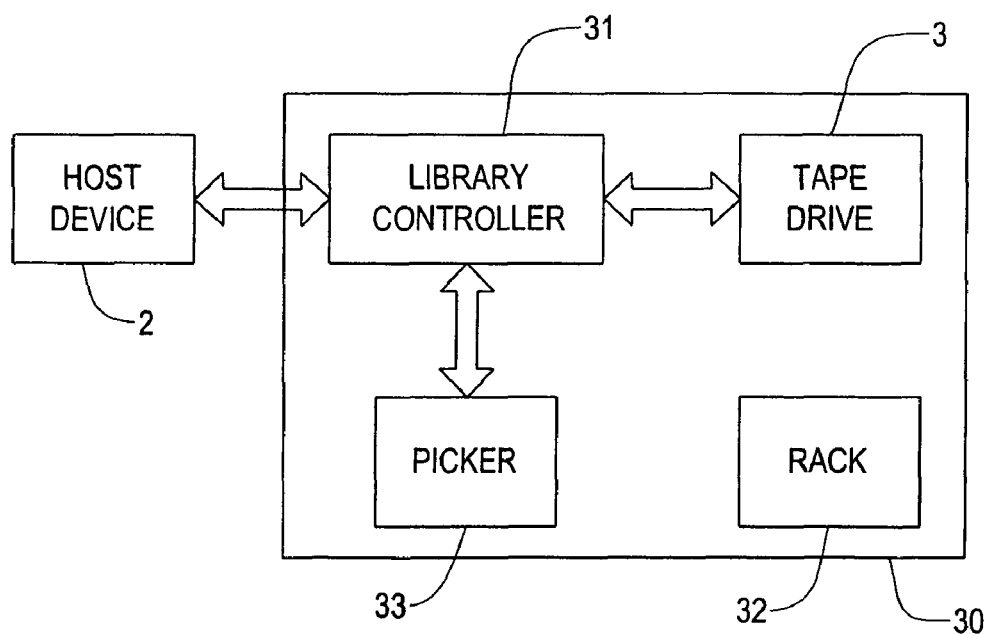
FIG. 4 is a schematic block diagram of a further embodiment of the invention.

FIG. 4 illustrates a further embodiment of the present invention, in which the data transfer system 1 comprises a host device 2 coupled to a data storage library 30. The data storage library 30 comprises a library controller 31, a rack 32 storing a plurality of tape cartridges (or other removable data storage items), at least one tape drive 3 (or other primary data transfer device), and a picker 33 or other transport mechanism for transporting tape cartridges between the rack 32 and the tape drive 3.

The library controller 31 stores and maintains a database of the tape cartridges held in the rack 32. The database stores, among other things, information unique to each tape cartridge, such as the serial number of each tape cartridge. The picker 33 may include a bar-code reader for reading a bar-code printed on a label of each tape cartridge, the bar-code corresponding to a serial number which is then stored in the database of the library controller 31. Alternatively, the unique information stored by the database may relate to the location of each tape cartridge within the rack 32 or the date and time on which the tape cartridge was added to the rack 32. It will be appreciated that other information may be used to uniquely identify each tape cartridge within the rack 32 and that the examples given are provided by way of example only.

Access to the data storage library 30 is achieved via the library controller 31, which receives requests from the host device 2 to store data to and retrieve data from the library 30. The library controller 31, rather than the tape drive 3, is responsible for receiving and responding to a request from the host device 2 for a unique identifier. In response to the request for a unique identifier, the library controller 31 returns to the host device 2 the unique identifier stored in the database for the relevant tape cartridge.

The encryption key generated by the host device 2 is then delivered to and stored by the tape drive 3, which encrypts and decrypts data in the manner described above. Alternatively, the library controller 31, rather than the tape drive 3, may include the encryption engine 16 and key memory 17 for encrypting and decrypting data during data transfer between the host device 2 and the tape drive 3. As a further alternative, the data transfer system 1 may include a secondary data transfer device 28, as described above with reference to FIG. 3, which may be located between either the host device 2 and the library controller 31 or the library controller 31 and the tape drive 3, to encrypt and decrypt data on-the-wire.

In the embodiments described above, the host device 2 issues a command to the tape drive 3 or library controller 31 requesting that a unique identifier be returned. The tape drive 3 or library controller 31 then returns the unique identifier (e.g. cartridge serial number) to the host device 2. Accordingly, no user interaction is required in order to store and retrieve data, which can prove invaluable in large data backup systems where user interaction is generally limited to maintenance only (e.g. the replacing of old or faulty tape cartridges). Nevertheless, the host device 2 may alternatively or additionally accept the unique identifier from a user input device (e.g. a keyboard) connected to the host device 2. A user is then able to provide the host device 2 with the unique identifier (e.g. the serial number) of the relevant tape cartridge.

With the data transfer system embodying the present invention, the encryption and decryption of backup data is moved from the host device to a data transfer device. This frees up valuable resources on the host device that would otherwise be consumed by software encryption. Moreover, by employing identity-based encryption, the management of encryption keys is greatly simplified. In particular, there is no requirement to store a database of encryption keys, which might otherwise serve as a potential security risk. Instead, only a single master key need be securely stored at the host device.

The encryption and decryption of backup data using a master key and unique identifier is of particular value in data storage libraries comprising many hundreds of removable data storage items, each item comprising data encrypted using a different encryption key. The use of a single encryption key to encrypt all data stored within a large data storage library could potentially reduce the security of the encrypted data. However, the data transfer system of the present invention ensures that data stored to each removable data storage item are encrypted using a different encryption key, thereby further improving data security.

A further advantage of the present invention is that in the event that encrypted data need to be recovered at a site remote from the host device (e.g. a disaster recovery scenario at a mirror site), only the master key of the host device needs to be sent securely to the remote site.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A data transfer system comprising a host device and a data transfer device, wherein the hose device is operable to:
   receive, from the data transfer device, information unique to a removable data storage item when the removable data storage item is inserted into a drive of the data transfer device;
   generate an encryption key based upon the information unique to the removable data storage item onto which data are to be stored; and
   deliver the encryption key to the data transfer device; and
   wherein the data transfer device is operable to:
      receive the encryption key from the host device;
      receive data to be stored; and
      encrypt the data using the encryption key;
   wherein the data transfer device is operable to store the encryption key in key memory and delete the encryption key from the key memory when the removable data storage item is removed from the drive.

2. The data transfer system according claim 1, wherein the data transfer device requests an encryption key from the host device each time a tape cartridge is inserted into the drive of the data transfer device.

3. The data transfer system according to claim 1, wherein the data transfer device is operable to prevent a user from obtaining a copy of the encryption key by overwriting a key memory that stores the encryption key after the data is stored on the removable data storage item.

4. The data transfer system according to claim 1, wherein the information comprises a serial number that is read from the removable data storage item.

5. The data transfer system according to claim 1, wherein the data transfer device is operable to store the encrypted data to the removable data storage item.

6. The data transfer system according to claim 1, wherein the data transfer device is operable to output the encrypted data to a further data transfer device, the further data transfer device being operable to receive the encrypted data and store the encrypted data to the removable data storage item.

7. The data transfer system according to claim 1, wherein the host device is operable to:
   generate a decryption key based upon information unique to the removable data storage item from which data are to be retrieved; and
   deliver the decryption key to the data transfer device; and
   wherein the data transfer device is operable to:
      receive the decryption key from the host device;
      receive data to be retrieved; and
      decrypt the data using the decryption key.

8. A method executed by a tape drive, comprising:
   reading a serial number from a tape cartridge when the tape cartridge is inserted into the tape drive;
   transmitting a request to a host device to generate an encryption key when the tape cartridge is inserted into the tape drive, the request also including the serial number;
   receiving, from the host device, the encryption key that is derived from the serial number;
   storing the encryption key in key memory located in the tape drive;
   encrypting data from the host device with the encryption key to generate encrypted data;
   storing the encrypted data on the tape cartridge; and
   deleting the encryption key from the key memory when the tape cartridge is removed from the tape drive.

9. The method of claim 8 further comprising, preventing a user, the host device, and a controller in the tape drive from obtaining a copy of the encryption key by only allowing an encryption engine in the tape drive to read the key memory.

10. A data transfer device for storing data to a removable data storage item, the data transfer device being operable to:
    retrieve information unique to the removable data storage item when the removable data storage item is inserted into a drive in the data transfer device;
    output, to a host device, the information unique to the removable data storage item;
    receive, from the host device, an encryption key derived from the information unique to and output by the data transfer device;
    store the encryption key in key memory of the data transfer device;
    receive data to be stored;
    encrypt the data using the encryption key; and
    store the encrypted data to the removable data storage item; and
    delete the encryption key from the key memory when the removable data storage item is removed from the drive.

11. The data transfer device according to claim 10, wherein the data transfer device is suitable for retrieving and outputting data from the removable data storage item, and the data transfer device is operable to:
    receive a decryption key unique to the removable data storage item;
    retrieve encrypted data from the removable data storage item;
    decrypt the encrypted data using the decryption key; and
    output the decrypted data.

12. The data transfer device according to claim 10, wherein the data transfer device is a tape drive and the removable data storage item is a tape cartridge.

13. A data transfer system comprising a host device and a data transfer device, wherein the hose device is operable to:
    receive, from the data transfer device, information unique to a removable data storage item when the removable data storage item is inserted into a drive of the data transfer device;
    generate an encryption key based upon the information unique to the removable data storage item onto which data are to be stored; and
    deliver the encryption key to the data transfer device; and
    wherein the data transfer device is operable to:
       receive the encryption key from the host device;
       receive data to be stored; and
       encrypt the data using the encryption key;
    wherein data transfer device is operable to store the encryption key in key memory and delete the encryption key from the key memory when the tape cartridge is inserted into the data transfer device.

* * * * *

UNITED STATES PATENT AND TRADEMARK OFFICE
CERTIFICATE OF CORRECTION

PATENT NO. : 7,818,587 B2  
APPLICATION NO. : 11/493910  
DATED : October 19, 2010  
INVENTOR(S) : John William Drew et al.

Page 1 of 1

It is certified that error appears in the above-identified patent and that said Letters Patent is hereby corrected as shown below:

In column 9, line 12, in Claim 1, delete "hose" and insert -- host --, therefor.

In column 9, line 29, in Claim 2, after "according" insert -- to --.

In column 10, line 27, in Claim 10, after "key" delete "and".

In column 10, line 47, in Claim 13, delete "hose" and insert -- host --, therefor.

Signed and Sealed this  
Nineteenth Day of April, 2011

David J. Kappos  
*Director of the United States Patent and Trademark Office*